Aug. 15, 1939  F. J. NEVISON  2,169,811
METHOD OF PRESERVING FISH, FROGS, AND THE LIKE
Filed Dec. 14, 1937
Fig. 1.
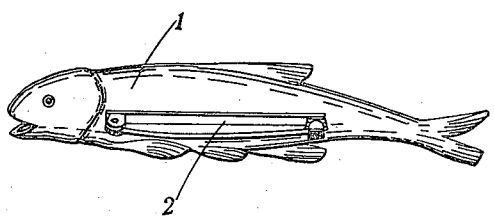
Fig. 2.
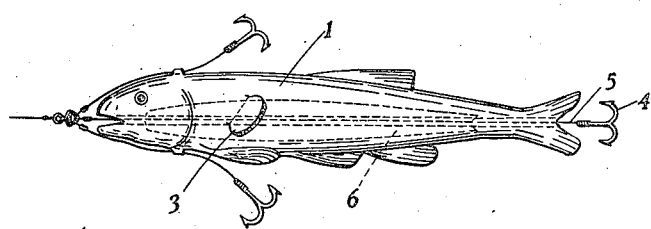
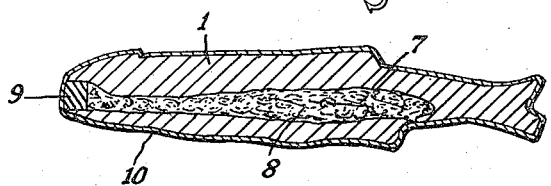
Fig. 4.
Fig. 3.
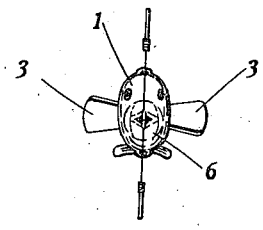
INVENTOR
Frederick John Nevison
BY
Alexander Dowell
ATTORNEYS Patented Aug. 15, 1939

2,169,811

UNITED STATES PATENT OFFICE 2,169,811

METHOD OF PRESERVING FISH, FROGS, AND THE LIKE

Frederick John Nevison, The Bank, Barnard Castle, England

Application December 14, 1937, Serial No. 179,787
In Great Britain February 12, 1937

2 Claims. (Cl. 43—46)

This invention consists in an improved method of preserving fish, frogs, and the like, with a view to providing a lifelike decorative novelty in the form a brooch or a pin, an article of utility such as permanent bait for fishing, or an exhibit for a museum, school or the like.

Hitherto in the preservation of fish and the like, the dead fish or other creature has been placed in alcohol or other dehydrating or preserving medium, but the results have not been satisfactory as the amount of penetration of the alcohol is only skin deep, while the resulting product has a "dead" appearance.

In one process for preserving beetles the dead or alive beetle was first placed into a solution of alcohol, salicylic acid and sal ammoniac and afterwards allowed to dry in a cool chamber. In processes for preserving animals, plants and other specimens, the dead specimens were treated with alcohol, then with a solvent for solid hydrocarbons such as paraffins and finally with paraffin wax or its equivalent. In a process for treating insects the wings of the insects were coated with preparations of cellulose.

According to the invention the creature to be preserved is placed alive in alcohol or its equivalent preservative and the carcass afterwards sealed from the atmosphere by applying thereto a transparent waterproof cement or covering to retain the preservative inside the carcass.

By placing the creature in the alcohol in accordance with the invention, although death is very quick, there is time for a quantity of alcohol to be taken in by the creature through its breathing apparatus before it expires, so that it becomes impregnated from without and within. By this it will be seen that any preservative which will be drawn in by the creature prior to its expiry, and which will not have any deleterious effect on the carcass may be used. Hence such preservative is intended to be covered by the term alcohol or its equivalent preservative and may include ether and chloroform.

The invention will now be described by way of example in connection with the preservation of a fish. According to this method the fish is immersed alive in surgical liquid alcohol which is preferably colourless. The fish is left in the alcohol for a considerable time, e. g., from seven days to a month. After this operation the guts of the fish are withdrawn or compressed only. Withdrawal may be effected by opening the mouth of the fish and inserting a screw-theaded probe, passing this longitudinally into the fish and turning it. The fish is then packed inside with cotton-wool or the like or sealing medium such as cellulose cement, right up to the mouth and the mouth sealed with such sealing medium. The scum resulting from the pickling is rubbed off the outside of the fish, after which the fish skin is allowed to dry for about fifteen minutes.

Where brightening of the colours on the fish is necessary, or where it is desired to make a fish like a minnow represent a trout, this is effected by applying water colours or other colours not affected by cellulose or like cement, to the desired places.

The fins, tail in the case of fish, and any other projections are then stiffened by applying to them transparent cellulose cement or the like. After these portions have dried, three or four coats of transparent cellulose cement or the like are applied to the whole of the outside of the fish, preferably by brushing. About twenty minutes to an hour may elapse between the application of each coating, depending upon the temperature of the room or workshop in which the operation is being carried out. Finally, the whole fish is dipped in a cellulose cement bath and allowed to dry. This effects a complete sealing of both the inside and the outside of the fish so that the preserving medium remains inside the fish and in its tissues. This sealing is the secret of the successful preservation of the fish.

The eyes are preferably removed and replaced by imitation eyes which may comprise small opaque white or whitish beads, according to the colour of the "white" of the natural eye, threaded on black—or other colour—headed pins which are inserted in the eye sockets, the beads forming the whites and the black—or other colour—head of the pin forming the pupils of the eyes. The application of the artificial eyes is effected preferably before the final dipping of the fish in the cellulose cement bath.

The fish is now ready for mounting or any other use to which it is to be put, and the accompanying drawing shows examples of such mounting or other use.

In the said drawing:

Fig. 1 is a perspective view of a fish mounted on a bar pin.

Fig. 2 is a side elevation of a fish used as spinner bait.

Fig. 3 is a front end view of Fig. 2.

Fig. 4 is a longitudinal sectional elevation of a fish treated according to the invention.

If the fish is to be used for a brooch the fish may be mounted on a bar pin 2 by applying cellulose cement to one side of its body and thereby securing it to the bar of the pin as shown in Fig. 1.

If the fish is to be used as bait, when the fish is completely finished it may have spinner fins secured in its front portion, for example by means of cellulose cement, a convenient method of fixing consisting in forming oppositely inclined slots just behind each shoulder and cementing celluloid fins 3 in the said slots as shown in Figs. 2 and 3; while the hooks 4 are secured to wire 5 which has been passed through the body of the fish 1 from head to tail previous to the packing operation. Alternatively the wire may be passed through a tube in the body of the fish 1, the said tube being sealed into the body at each end. The tube may take the form of an "eyed" weight 6.

Fig. 4 shows in section a fish prepared in accordance with the process of the present invention, 7 indicating the cavity left after degutting the fish, and 8 the cotton wool with which the cavity 7 is packed, while 9 is the cellulose cement with which the mouth is sealed and 10 the final coating of cellulose cement. For convenience the fish skeleton is omitted.

The invention may be applied in a similar manner to frogs, newts and the like.

The frogs and newts may be mounted by securing their feet to a frame secured to a bar pin either additionally or alternatively to a body mounting.

The invention may be applied to all manner and sizes of creatures, for example full grown fish and reptiles for exhibition in museums.

I claim:

1. The method of preserving fish and reptiles wherein the creature is placed alive in an alcohol preservative and the carcass afterwards sealed from the atmosphere by applying thereto a transparent waterproof cement to retain the preservative inside the carcass.

2. The method according to claim 1 wherein after the creature has been left in the alcohol preservative for a considerable time it is packed inside with cotton wool and the mouth sealed with cellulose cement.

FREDERICK JOHN NEVISON.